(12) United States Patent
Nagata et al.

(10) Patent No.: US 10,759,421 B2
(45) Date of Patent: Sep. 1, 2020

(54) CONTROL DEVICE FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Shinichi Nagata, Ebina (JP); Akitoshi Minemura, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 98 days.

(21) Appl. No.: 16/023,935

(22) Filed: Jun. 29, 2018

(65) Prior Publication Data
US 2019/0039614 A1 Feb. 7, 2019

(30) Foreign Application Priority Data
Aug. 3, 2017 (JP) .................................. 2017-151051

(51) Int. Cl.
*B60W 30/095* (2012.01)
*B60Q 9/00* (2006.01)
(Continued)

(52) U.S. Cl.
CPC .......... *B60W 30/0956* (2013.01); *B60Q 9/00* (2013.01); *B60W 30/09* (2013.01); *B60W 50/14* (2013.01);
(Continued)

(58) Field of Classification Search
CPC .............. B60Q 9/00; B60W 2050/143; B60W 2550/10; B60W 30/09; B60W 30/0956;
(Continued)

(56) References Cited

U.S. PATENT DOCUMENTS

2014/0324330 A1\* 10/2014 Minemura ............... G08G 1/16
701/301
2016/0185345 A1\* 6/2016 Sasabuchi ............. B60W 30/08
701/301
(Continued)

FOREIGN PATENT DOCUMENTS

JP 2007-241898 A 9/2007
JP 2007-323578 A 12/2007
(Continued)

*Primary Examiner* — Jaime M Holliday
(74) *Attorney, Agent, or Firm* — Sughrue Mion, PLLC

(57) ABSTRACT

A control device for a vehicle includes a camera sensor and an ECU. The ECU defines a specified area based on a position of a stationary object when the recognized objects include the stationary object. The ECU performs first driving support for reducing a possibility of a collision between a moving body and the host vehicle when the recognized objects include the moving body which is positioned within the specified area. Boundary lines partitioning the specified area include a first traveling direction boundary line extending in a traveling direction of the host vehicle. An inside of the specified area is a side on which the stationary object is positioned with respect to the first traveling direction boundary line. The first traveling direction boundary line is set on a side opposite to the stationary object across a reference line set based on a predicted course of the host vehicle.

6 Claims, 10 Drawing Sheets

(51) Int. Cl.
*B60W 30/09* (2012.01)
*G06K 9/00* (2006.01)
*B60W 50/14* (2020.01)

(52) U.S. Cl.
CPC ..... *G06K 9/00362* (2013.01); *G06K 9/00805* (2013.01); *B60W 2050/143* (2013.01); *B60W 2554/00* (2020.02)

(58) Field of Classification Search
CPC .............. B60W 50/14; G06K 9/00805; G06K 9/00362
See application file for complete search history.

(56) References Cited

U.S. PATENT DOCUMENTS

2017/0217394 A1\* 8/2017 Shima ..................... B60R 21/00
2018/0281788 A1\* 10/2018 Uchida ................ B60W 40/09

FOREIGN PATENT DOCUMENTS

JP            5172366 B2     3/2013
JP            5729416 B2     6/2015

\* cited by examiner

SCENE 1A

SCENE 1B

SCENE 1C

SCENE 1D

SCENE 2A

SCENE 2B

SCENE 2C

SCENE 3A

SCENE 3B

SCENE 4A

SCENE 4B

SCENE 4C

CONTROL DEVICE FOR VEHICLE AND CONTROL METHOD FOR VEHICLE

INCORPORATION BY REFERENCE

The disclosure of Japanese Patent Application No. 2017-151051 filed on Aug. 3, 2017 including the specification, drawings and abstract is incorporated herein by reference in its entirety.

BACKGROUND

1. Technical Field

The disclosure relates to a control device for a vehicle and a control method for a vehicle.

2. Description of Related Art

Japanese Patent No. 5172366 discloses a technique adapted such that the course of a moving body moving in front of a host vehicle is predicted and a collision between the host vehicle and the moving body is avoided as much as possible. Specifically, according to the related art, the moving body and a stationary object on a sidewalk adjacent to the traveling lane of the host vehicle are detected by means of a camera mounted in the vehicle. Then, a change in the distance between the stationary object and the moving body is calculated by a captured image being analyzed, and the time when the moving body is predicted to enter the traveling lane in order to avoid the stationary object is calculated based on the relative speed of the moving body with respect to the stationary object. In addition, the time when the host vehicle passes by the stationary object is calculated based on the distance between the host vehicle and the stationary object. In a case where the two times calculated as described above are the same as each other, a determination is made that the host vehicle and the moving body may collide with each other. Then, a driver is notified of the possibility of the collision between the host vehicle and the moving body by means of voice or the like.

SUMMARY

The related art assumes that the moving body enters the course of the host vehicle in order to avoid the stationary object as the stationary object is positioned on the course of the moving body. In a case where the stationary object and the moving body are present in front of the host vehicle, however, the course of the moving body and the stationary object do not necessarily overlap each other. For example, in a case where a vehicle is stopped on the sidewalk and a pedestrian moves on the sidewalk that is on the side opposite to the sidewalk on which the vehicle is stopped, the stopped vehicle does not affect the pedestrian's course at all. In a case where a vehicle is stopped on the sidewalk with a bicycle traveling on the roadway adjacent to the sidewalk, it cannot be said that the bicycle will not enter the course of the host vehicle to avoid the stopped vehicle although the stopped vehicle is not positioned on the course of the bicycle. In other words, the probability of the moving body changing the course thereof toward the course of the host vehicle depends on the positional relationship between the stationary object and the moving body in the road width direction.

In the related art, collision risk determination that considers the positional relationship between the stationary object and the moving body in the road width direction is not performed. Accordingly, the possibility of a collision between the moving body and the host vehicle cannot be accurately determined and a useless alarm may be issued. In a situation in which the possibility of a collision is clearly zero, an alarm and intervention in driving result in a driver's discomfort.

The disclosure provides a control device for a vehicle and a control method for a vehicle with which a collision with a moving body entering the course of a host vehicle to avoid a stationary object can be forestalled as much as possible with a driver's discomfort suppressed as much as possible in a case where the stationary object is in front of the host vehicle.

A first aspect of the disclosure relates to a control device for a vehicle. The vehicle includes a camera sensor. The control device includes an electronic control unit. The electronic control unit is configured to recognize objects present in front of a host vehicle by using at least the camera sensor. The electronic control unit is configured to define a specified area by using a position of a stationary object as a reference when the recognized objects include the stationary object. The electronic control unit is configured to perform first driving support when the electronic control unit determines that the recognized objects include a moving body and the moving body is positioned within the specified area. The first driving support is support that reduces a possibility of a collision between the moving body and the host vehicle. Boundary lines partitioning the specified area include a first traveling direction boundary line extending in a traveling direction of the host vehicle. An inside of the specified area is a side on which the stationary object is positioned with respect to the first traveling direction boundary line. The first traveling direction boundary line is set on a side opposite to the stationary object across a reference line set based on a predicted course of the host vehicle.

According to the first aspect of the disclosure, in a case where a determination is made that the stationary object and the moving body are positioned in front of the host vehicle, the moving body may enter the course of the host vehicle in order to avoid the stationary object when the moving body moves on the side of the stationary object with respect to the reference line. When the moving body moves on the side opposite to the stationary object with respect to the reference line, the possibility of the moving body entering the course of the host vehicle in order to avoid the stationary object is relatively low. With the vehicle control device configured as described above, a collision between the moving body and the host vehicle can be forestalled as much as possible by functioning of the first driving support with respect to a moving body that moves on the side of the stationary object with respect to the reference line and may collide with the host vehicle. With respect to a moving body outside the specified area and on the side opposite to the stationary object with respect to the reference line, a driver's discomfort can be suppressed as much as possible by non-functioning of the first driving support.

In the control device according to the first aspect of the disclosure, the electronic control unit may be configured to perform second driving support when the electronic control unit determines that the moving body is not positioned within the specified area. The second driving support may be support that reduces the possibility of the collision between the moving body and the host vehicle, and may be at least slower in support timing or smaller in support amount than the first driving support.

According to the first aspect of the disclosure, the moving body is less likely to enter the course of the host vehicle in a case where the position of the moving body is outside the specified area than in a case where the position of the moving body is within the specified area. However, the moving body and the host vehicle may collide with each other in a case where the moving body enters the course of the host vehicle. Performed in a case where the moving body is outside the specified area is the second driving support, which is slower in support timing or smaller in support amount than the first driving support, and thus the possibility of a collision between the host vehicle and the moving body can be further reduced with the driver's discomfort suppressed as much as possible.

In the control device according to the first aspect of the disclosure, boundary lines partitioning the specified area may include a second traveling direction boundary line extending in a traveling direction of the host vehicle. The inside of the specified area may be from the first traveling direction boundary line to the second traveling direction boundary line. The second traveling direction boundary line may be set on a side opposite to the reference line across an end portion on a side far from the reference line as one of both width-direction ends of the stationary object.

According to the first aspect of the disclosure, in a case where the stationary object is in front of the moving body, routes for the moving body to avoid the stationary object are divided into a route passing through the side of the reference line with respect to the stationary object and a route passing through the side opposite to the reference line with respect to the stationary object. Of the routes described above, the former route, on which the moving body enters the course of the host vehicle, has the possibility of a collision with the host vehicle. As a result of the above-described setting of the second traveling direction boundary line of the specified area, with respect to a moving body that is relatively likely to take the former route, a collision between the moving body and the host vehicle can be forestalled as much as possible by functioning of the first driving support. With respect to a moving body that is relatively likely to take the latter route, the driver's discomfort can be suppressed as much as possible by non-functioning of the first driving support.

In the control device according to the first aspect of the disclosure, the electronic control unit may be configured to cause at least the support timing of the first driving support to become slower or cause the support amount of the first driving support to become smaller when the electronic control unit determines that the moving body is positioned on a side opposite to the stationary object across the reference line in the specified area than when the electronic control unit determines that the moving body and the stationary object are positioned on the same side.

According to the first aspect of the disclosure, the possibility of a collision between a moving body and the host vehicle can be further reduced when a wide specified area is on the side opposite to the stationary object with respect to the reference line. However, a moving body moving on the side opposite to the stationary object with respect to the reference line is relatively unlikely to enter the course of the host vehicle to avoid the stationary object. Therefore, with respect to a moving body that moves on the side opposite to the stationary object with respect to the reference line and is relatively unlikely to collide, the driver's discomfort can be suppressed as much as possible by the support timing of the first driving support becoming slower or the support amount of the first driving support becoming smaller than in the case of a moving body that moves on the same side as the stationary object and is relatively more likely to collide.

In the control device according to the aspect of the disclosure, the electronic control unit may be configured to cause at least the support timing of the first driving support to become faster or cause the support amount of the first driving support to become larger when the specified area straddles a roadway outside line recognized by the camera sensor than when the specified area does not straddle the roadway outside line.

According to the first aspect of the disclosure, in a case where the stationary object is in front of the moving body with the outside of the roadway outside line empty, the moving body is capable of avoiding the stationary object through the outside of the roadway outside line. Accordingly, the possibility of the moving body entering the course of the host vehicle is further reduced. In a case where the outside of the roadway outside line is not empty, the moving body avoids the stationary object through the inside of the roadway outside line. Accordingly, the possibility of the moving body entering the course of the host vehicle further increases. Therefore, in a case where the specified area straddles the roadway outside line, that is, in a case where the possibility of the outside of the roadway outside line not being empty is relatively high, the possibility of a collision between the host vehicle and the moving body can be further reduced by the support timing of the first driving support becoming faster or the support amount of the first driving support becoming larger than in a case where the specified area does not straddle the roadway outside line.

In the control device according to the first aspect of the disclosure, the first driving support may include at least one of supporting deceleration of the host vehicle by a driver, supporting avoidance steering of the host vehicle by the driver, and issuing an alarm with respect to the driver. The same applies to the second driving support.

A second aspect of the disclosure relates to a control method for a vehicle including a camera sensor and an electronic control unit. The control method includes: recognizing, by the electronic control unit, objects present in front of a host vehicle by using at least a camera sensor; defining, by the electronic control unit, a specified area by using a position of a stationary object as a reference when the recognized objects include the stationary object; and performing, by the electronic control unit, first driving support when the electronic control unit determines that the recognized objects include the moving body and the moving body is positioned within the specified area. The first driving support is support that reduces a possibility of a collision between the moving body and the host vehicle. Boundary lines partitioning the specified area include a first traveling direction boundary line extending in a traveling direction of the host vehicle. An inside of the specified area is a side on which the stationary object is positioned with respect to the first traveling direction boundary line. The first traveling direction boundary line is set on a side opposite to the stationary object across a reference line set based on a predicted course of the host vehicle.

As described above, with the vehicle control device and the vehicle control method according to the aspects of the disclosure, a collision with a moving body entering the course of a host vehicle to avoid a stationary object can be forestalled as much as possible with a driver's discomfort suppressed as much as possible in a case where a determination is made that the stationary object and the moving body are positioned in front of the host vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure n will be described with reference to accompanying drawings. The disclosure is not limited to the numbers, quantities, amounts, ranges, and so on of respective elements mentioned in the following description of the embodiments unless limitation is clearly stated or unless limitation is obvious in principle. Structures described below in relation to the embodiments are not essential for the disclosure unless their essentialness is clearly stated or unless their essentialness is obvious in principle.

First Embodiment

Configuration of Vehicle Control Device

Figure 1:
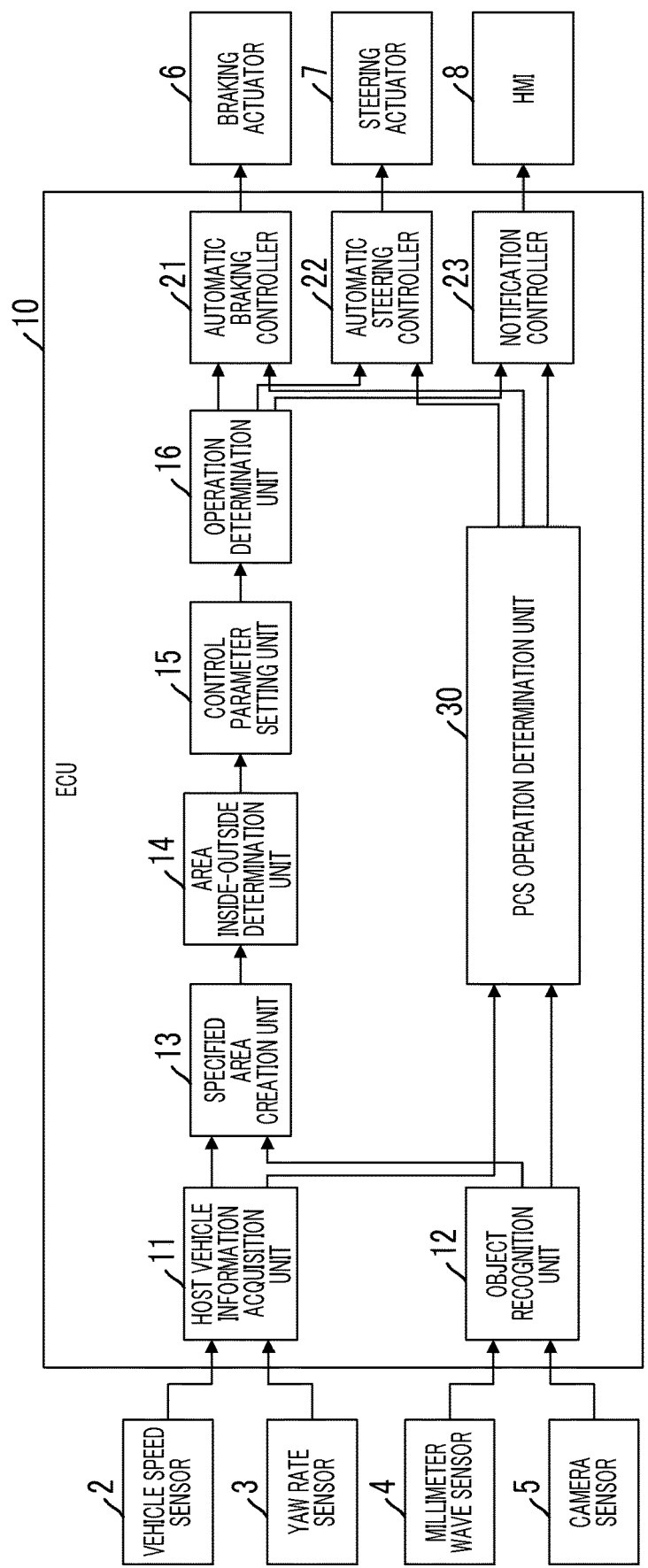
FIG. 1 is a block diagram illustrating a configuration of a vehicle control device according to embodiments of the disclosure.

A vehicle control device according to the embodiments is a device detecting the possibility of a collision of a host vehicle in which the vehicle control device is mounted and supporting vehicle driving by a driver so that the collision of the host vehicle is avoided as much as possible. FIG. 1 is a block diagram illustrating the configuration of the vehicle control device according to the embodiments. The configuration of the vehicle control device described in the embodiments is common to first to third embodiments to be described below.

As illustrated in FIG. 1, a vehicle control device 10 is configured such that signals are captured from various sensors 2, 3, 4, 5 attached to the vehicle and various actuators 6, 7 and a human machine interface (HMI) 8 are operated by operation signals obtained by processing of the signals from the various sensors 2, 3, 4, 5. The various sensors 2, 3, 4, 5 include the sensors 2, 3 acquiring information relating to motion states of the vehicle and the sensors 4, 5 acquiring information relating to the surrounding environment of the vehicle and peripheral objects. Specifically, the former sensors include, for example, the vehicle speed sensor 2 measuring the traveling speed of the vehicle from the rotation speed of wheels and the yaw rate sensor 3 measuring the turning angular velocity of the vehicle. The latter sensors include the millimeter wave sensor 4 disposed in, for example, the front grill of the vehicle and the camera sensor 5 disposed on, for example, the windshield of the vehicle. The camera sensor is configured as a stereo camera capable of measuring the distance to an imaging object. The vehicle speed sensor 2, the yaw rate sensor 3, the millimeter wave sensor 4, and the camera sensor 5 are connected to the vehicle control device 10 directly or via a communication network such as an in-vehicle controller area network (CAN).

The various actuators 6, 7 include the braking actuator 6 for decelerating the vehicle and the steering actuator 7 for steering the vehicle. The braking actuator 6 is, for example, a hydraulic brake. In a case where the vehicle is a hybrid vehicle or an electric vehicle, an electric power regenerative brake is also included in the braking actuator 6. The steering actuator 7 is a power steering system using a motor or hydraulic pressure. The HMI 8 is an interface for information output and input between the driver and the vehicle control device 10. The HMI 8 is provided with, for example, a display for image information display for the driver, a speaker for voice output, and a touch panel on which the driver performs an input operation.

The vehicle control device 10 is an electronic control unit (ECU) that has at least one central processing unit (CPU), at least one read-only memory (ROM), and at least one random access memory (RAM). The ROM stores various data including various programs and maps for collision avoidance. Various functions are realized in the vehicle control device 10 by the programs stored in the ROM being loaded into the RAM and executed by the CPU. The vehicle control device 10 may also include a plurality of ECUs. In FIG. 1, especially a function relating to collision avoidance is expressed in blocks among the functions of the vehicle control device 10. The other functions of the vehicle control device 10 are not illustrated here.

The vehicle control device 10 has a function to detect the possibility of a collision with a moving body and perform driving support for collision avoidance in a case where the moving body such as a pedestrian, a two-wheeled vehicle, and an automobile moves in front of the host vehicle. The above-described function is realized by a host vehicle information acquisition unit 11, an object recognition unit 12, a specified area defining unit 13, an area inside-outside determination unit 14, a control parameter setting unit 15, an operation determination unit 16, an automatic braking controller 21, an automatic steering controller 22, a notification controller 23, and a PCS operation determination unit 30 of the vehicle control device 10. Each of the above-described units does not exist as hardware in the vehicle control device 10 and is realized by software when the programs stored in the ROM are executed by the CPU.

The host vehicle information acquisition unit 11 acquires information from the vehicle speed sensor 2 and information from the yaw rate sensor 3 and calculates the motion states of the host vehicle based on the acquired information. In addition, the host vehicle information acquisition unit 11 predicts a course of the host vehicle from the motion states of the host vehicle. An actual steering angle acquired by a steering angle sensor (not illustrated) may be used in addition to the vehicle speed and the yaw rate for the host vehicle course prediction. The host vehicle information acquisition unit 11 updates a reference coordinate system centered on the host vehicle in accordance with the predicted course. In the reference coordinate system, the vertical axis is in the direction of the predicted course of the host vehicle, that is, the tangential direction of a host vehicle course prediction line and the horizontal axis is in the right-left direction.

The object recognition unit 12 recognizes objects around the host vehicle. Information acquired from the millimeter wave sensor 4 and the camera sensor 5 is used for peripheral object recognition. The object recognition unit 12 is capable of recognizing peripheral objects by using information of the camera sensor 5, by using information of the millimeter wave sensor 4 and information of the camera sensor 5 in combination by sensor fusion, or by using the two methods together. Recognized peripheral objects include moving bodies such as pedestrians, two-wheeled vehicles, and automobiles and stationary objects such as stopped vehicles, guardrails, buildings, and trees. In the object recognition unit 12, recognition of section lines such as roadway outside lines and roadway center lanes is also performed by processing of a captured image obtained by the camera sensor 5. The object recognition unit 12 calculates the position coordinates of the recognized objects and so on in the reference coordinate system.

The calculation result of the host vehicle information acquisition unit 11 and the recognition result of the object recognition unit 12 are sent to the specified area defining unit 13. The specified area defining unit 13 defines a specified area on the reference coordinate system based on the host vehicle course prediction line calculated by the host vehicle information acquisition unit 11 and the recognition result of the object recognition unit 12 and by using the stationary object position recognized by the object recognition unit 12 as a base point. The specified area is a reference for determining the degree of driving support for collision avoidance, and the method for defining the specified area is a main part of the driving support for collision avoidance according to the present embodiment. The specified area defining method will be described in detail later. The definition of the specified area is not performed when no specific stationary object is included in the objects recognized by the object recognition unit 12. The specific stationary object means a stationary object forcing a moving body to change the course thereof, such as a stopped vehicle on a road.

Determination processing by the area inside-outside determination unit 14 is performed after the specified area is defined by the specified area defining unit 13. The area inside-outside determination unit 14 determines whether the moving body is positioned inside or outside the specified area based on the position coordinates of the moving body recognized by the object recognition unit 12 on the reference coordinate system. The above-described determination is not performed in a case where no moving body is included in the objects recognized by the object recognition unit 12. After the determination by the area inside-outside determination unit 14 is performed, the determination result is sent to the control parameter setting unit 15.

The control parameter setting unit 15 sets control parameters of driving support for avoiding a collision with the moving body as much as possible based on the determination result of the area inside-outside determination unit 14. The driving support for collision avoidance includes supporting host vehicle deceleration by the driver by means of control of the braking actuator 6 and supporting avoidance steering of the host vehicle by the driver by means of control of the steering actuator 7. The driving support for collision avoidance also includes issuing an alarm with respect to the driver by screen display or voice of the HMI 8.

The control parameters for deceleration support set by the control parameter setting unit 15 are an operation timing threshold and a brake force as a control amount. The operation timing threshold is the relative distance between the host vehicle and the moving body or collision margin time (hereinafter, referred to as time-to-collision (TTC)). The brake force as a control amount has a set magnitude at which the driver can be aware of a risk from the sense of deceleration applied to the vehicle.

The control parameters for avoidance steering support set by the control parameter setting unit 15 are an operation timing threshold, steering torque as a control amount, and an avoidance margin width. The operation timing threshold for avoidance steering support may be a value different from the value of the operation timing threshold for deceleration support or may be set to the same value as the value of the operation timing threshold for deceleration support. The steering torque as a control amount has a set magnitude at which the driver can be aware of a risk from the steering torque applied to the steering wheel. The avoidance margin width means the road-width-direction margin width with respect to the moving body at a time when the host vehicle passes by the moving body.

The alarm control parameter is a notification timing threshold. The notification timing threshold is the distance between the host vehicle and the moving body or the TTC as is the case with the operation timing threshold. Still, the notification timing threshold is set to a value exceeding the operation timing threshold for an alarm to be issued before deceleration support and steering support. In the following description, the operation timing threshold and the notification timing threshold will be collectively referred to as a support timing threshold in some cases.

The control parameter setting unit 15 switches each of the above-described control parameter values depending on whether the moving body is positioned inside or outside the specified area. For example, the support timing threshold for support timing determination is set such that the value thereof is smaller when the moving body is positioned inside the specified area than when the moving body is positioned outside the specified area. The control amount corresponding to a support amount and the avoidance margin width are set such that the values thereof are larger when the moving body is positioned inside the specified area than when the moving body is positioned outside the specified area.

Each control parameter value is set by the switching as described above being performed such that intensive driving support for collision avoidance is provided in a case where a determination is made that the moving body is positioned inside the specified area. In a case where a determination is made that the moving body is positioned outside the specified area, each control parameter value can be set such that mild driving support for collision avoidance is provided. The intensive driving support is driving support with a relatively fast support timing and a relatively large support amount. The mild driving support means driving support with a relatively slow support timing and a relatively small support amount. In the present embodiment, the intensive driving support is an example of first driving support and the mild driving support is an example of second driving support.

The operation determination unit 16 determines whether or not to operate driving support for collision avoidance. Specifically, the operation determination unit 16 calculates the TTC by using information acquired from the host vehicle information acquisition unit 11 and the object recognition unit 12 and compares the calculated TTC to a TTC threshold in a case where, for example, the TTC is set as the support timing threshold. In a case where the TTC is within the TTC threshold, the operation determination unit 16 operates driving support for collision avoidance.

In the present embodiment, the operation determination unit 16 operates either avoidance steering support or deceleration support depending on situations. The operation determination unit 16 operates avoidance steering support prior to deceleration support in a case where, for example, the avoidance margin width can be ensured in the traveling lane of the host vehicle. In a case where the avoidance margin width cannot be ensured in the traveling lane of the host vehicle, the operation determination unit 16 operates deceleration support without operating avoidance steering support. A deceleration request is output from the operation determination unit 16 to the automatic braking controller 21 in a case where deceleration support is operated. An avoidance steering request is output from the operation determination unit 16 to the automatic steering controller 22 in a case where avoidance steering support is operated.

The operation determination unit 16 operates an alarm in any case. An alarm request is output from the operation determination unit 16 to the notification controller 23 in a case where an alarm is operated. Since the notification timing threshold has a set value exceeding the operation timing threshold, an alarm is issued prior to avoidance steering support operation or deceleration support operation in a case where there is a possibility of a collision between the host vehicle and the moving body. Neither avoidance steering support nor deceleration support is performed in a case where the TTC extends and does not fall within the operation timing threshold as a result of any avoidance behavior performed by the driver receiving the alarm.

The automatic braking controller 21 is a driver controlling the braking actuator 6. The automatic steering controller 22 is a driver controlling the steering actuator 7. The notification controller 23 is a driver controlling the HMI 8. The automatic braking controller 21, the automatic steering controller 22, and the notification controller 23 operate the braking actuator 6, the steering actuator 7, and the HMI 8 in accordance with a request from the operation determination unit 16, respectively. In a case where a request from the PCS operation determination unit 30 (described below) overlaps the request from the operation determination unit 16, the automatic braking controller 21, the automatic steering controller 22, and the notification controller 23 give priority to the request from the PCS operation determination unit 30.

The PCS operation determination unit 30 determines whether or not to operate a conventional pre-crash safety system (hereinafter, referred to as a PCS). The PCS suppresses a collision or mitigates collision damage by automatically operating the braking actuator 6 and the steering actuator 7 when a determination is made that the possibility of the collision is high. The driving support for collision avoidance described above is to cause the driver to perform an avoidance behavior by causing the driver to be aware of a collision risk. Accordingly, the possibility of a collision increases in a case where the driver performs no appropriate avoidance behavior. The PCS is provided for collision suppression or collision damage mitigation in the above case.

The calculation result of the host vehicle information acquisition unit 11 and the recognition result of the object recognition unit 12 are input to the PCS operation determination unit 30. The PCS operation determination unit 30 calculates the TTC or the distance to an object in front of the host vehicle as a determination parameter and compares the value of the determination parameter to a predetermined PCS operation timing threshold. The PCS is operated in a case where collision avoidance is impossible despite operation of driving support for collision avoidance. Accordingly, the PCS operation timing threshold has a set value smaller than the support timing threshold set by the control parameter setting unit 15. For example, in a case where the determination parameter is the TTC, the TTC threshold is set to five seconds for driving support for collision avoidance and the TTC threshold is set to three seconds for the PCS.

The PCS operation determination unit 30 operates the PCS when the TTC is within the TTC threshold. Firstly, an alarm request is output from the PCS operation determination unit 30 to the notification controller 23. Next, a deceleration request is output from the PCS operation determination unit 30 to the automatic braking controller 21. The deceleration request output at this time is an urgent request for automatically stopping the host vehicle in front of a target object with which the host vehicle may collide. In a case where the avoidance margin width is in the traveling lane of the host vehicle, an avoidance steering request is output from the PCS operation determination unit 30 to the automatic steering controller 22. The avoidance steering request output at this time is an urgent request for causing the host vehicle to reliably avoid a target object with which the host vehicle may collide.

As described above, the vehicle control device 10 according to the present embodiment is characterized by having a function to perform driving support for collision avoidance apart from the conventional PCS. The action and effect resulting from the driving support are characterized by the specified area defined by the specified area defining unit 13. A method by which the specified area defining unit 13 defines the specified area will be described in detail below.

Defining of Specified Area

Various scenes are assumed during specified area defining method design and the design is performed such that an appropriate determination is made in each of the scenes. Hereinafter, scenes considered during specified area defining method design will be described in relation to design content on which the consideration is based.

Illustrated in FIGS. 2A to 2D are four scenes that differ from one another in terms of the positional relationship among a host vehicle 1, a stopped vehicle 70 as a stationary object, and a pedestrian 60 as a moving body. Each of the scenes shows the positional relationship among the host vehicle 1, the pedestrian 60, and the stopped vehicle 70 in the reference coordinate system. In FIGS. 2A to 2D, a host vehicle course prediction line 53 drawn with a one-dot chain line corresponds to the vertical axis of the reference coordinate system, a roadway outside line 51 is drawn with a solid line on the left side of the host vehicle course prediction line 53, and a roadway center lane 52 is drawn with a dotted line on the right side of the host vehicle course prediction line 53. In each of the scenes, the stopped vehicle 70 is positioned outside the roadway outside line 51 and the pedestrian 60 is positioned closer to the host vehicle 1 than the stopped vehicle 70 in the direction of the vertical axis of the reference coordinate system. The scenes differ from one another merely in terms of the position of the pedestrian 60 in the direction of the horizontal axis of the reference coordinate system (road width direction).

Figure 2A:
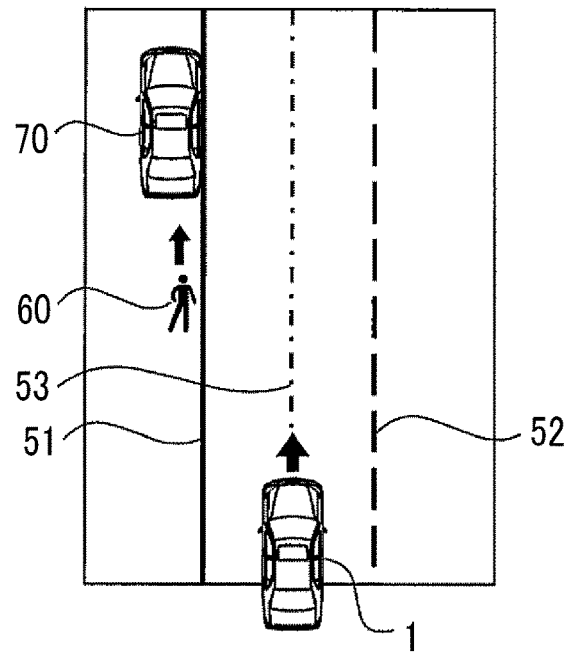
FIG. 2A is a diagram illustrating an example of the positional relationship among a host vehicle, a stationary object, and a moving body considered during setting of a first traveling direction boundary line of a specified area.

In Scene 1A illustrated in FIG. 2A, the pedestrian 60 moves toward the stopped vehicle 70 outside the roadway outside line 51. In Scene 1B illustrated in FIG. 2B, the pedestrian 60 moves outside the vehicle width of the host vehicle 1 and inside the roadway outside line 51. In Scene 1C illustrated in FIG. 2C, the pedestrian 60 moves inside the vehicle width of the host vehicle 1 and inside the roadway outside line 51. In Scene 1D illustrated in FIG. 2D, the pedestrian 60 moves inside the roadway outside line 51 and on the side opposite to the stopped vehicle 70 across the host vehicle course prediction line 53.

Considering each scene, in Scene 1A illustrated in FIG. 2A, the pedestrian 60 may move to the inside of the roadway outside line 51 in order to avoid the stopped vehicle 70. However, there is a margin in the road width direction between the stopped vehicle 70 and the host vehicle 1, and thus the possibility of a collision between the host vehicle 1 and the pedestrian 60 may not be very high even when the host vehicle 1 passes by the stopped vehicle 70 as it is. In Scene 1B illustrated in FIG. 2B, the pedestrian 60 is outside the vehicle width of the host vehicle 1, and thus the possibility of a collision between the host vehicle 1 and the pedestrian 60 may not be very high even when the host vehicle 1 passes by the stopped vehicle 70 as it is. Therefore, intensive driving support for collision avoidance can be deemed unnecessary in Scene 1A illustrated in FIG. 2A and Scene 1B illustrated in FIG. 2B. The presence of the stopped vehicle 70 in Scene 1A illustrated in FIG. 2A and Scene 1B illustrated in FIG. 2B, however, is a physical or psychological factor causing the pedestrian 60 to head toward the predicted course of the host vehicle 1. Therefore, desirable in Scene 1A illustrated in FIG. 2A and Scene 1B illustrated in FIG. 2B based on the basic idea of "risk avoidance" is, for example, specified area defining for operation of intensive driving support for collision avoidance.

Figure 2B:
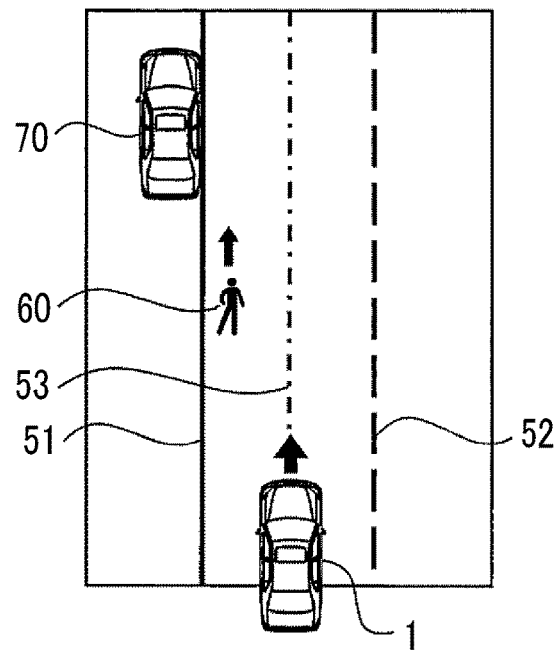
FIG. 2B is a diagram illustrating an example of the positional relationship among the host vehicle, the stationary object, and the moving body considered during setting of the first traveling direction boundary line of the specified area.
Figure 2C:
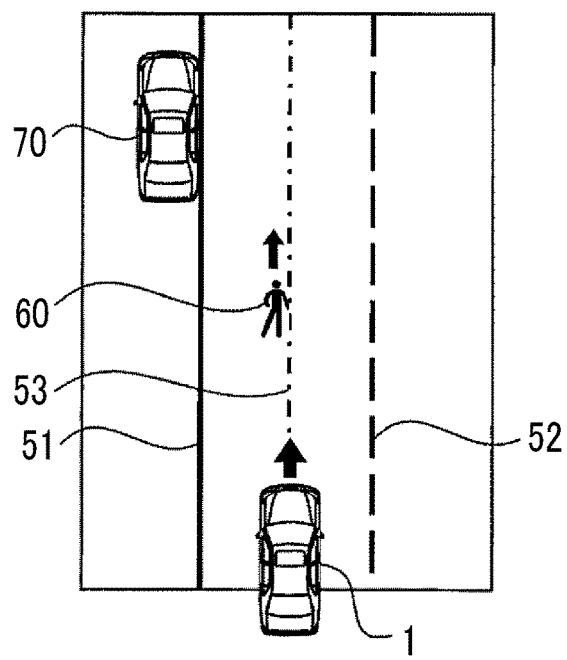
FIG. 2C is a diagram illustrating an example of the positional relationship among the host vehicle, the stationary object, and the moving body considered during setting of the first traveling direction boundary line of the specified area.
Figure 2D:
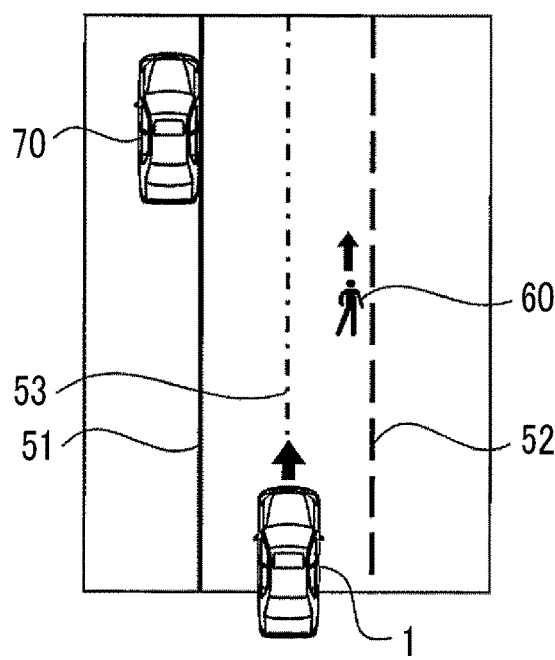
FIG. 2D is a diagram illustrating an example of the positional relationship among the host vehicle, the stationary object, and the moving body considered during setting of the first traveling direction boundary line of the specified area.

In Scene 1C illustrated in FIG. 2C, the pedestrian 60 is already on the predicted course of the host vehicle 1. Accordingly, intensive driving support for collision avoidance needs to be performed and, for example, specified area defining for intensive driving support operation is desirable. In Scene 1D illustrated in FIG. 2D, operation of intensive driving support for collision avoidance does not have to be performed. This is because the presence of the stopped vehicle 70 in Scene 1D illustrated in FIG. 2D is not a physical or psychological factor causing the pedestrian 60 to head toward the predicted course of the host vehicle 1. Intensive driving support in this situation troubles the driver. In this case, mild driving support for collision avoidance is operated although intensive driving support is not operated. As a result, the possibility of a collision between the host vehicle 1 and the pedestrian 60 can be further reduced with the driver's discomfort suppressed as much as possible. Furthermore, the conventional PCS is operated with a condition satisfied, and thus a collision between the host vehicle 1 and the pedestrian 60 is further suppressed or collision damage is further mitigated.

Figure 3:
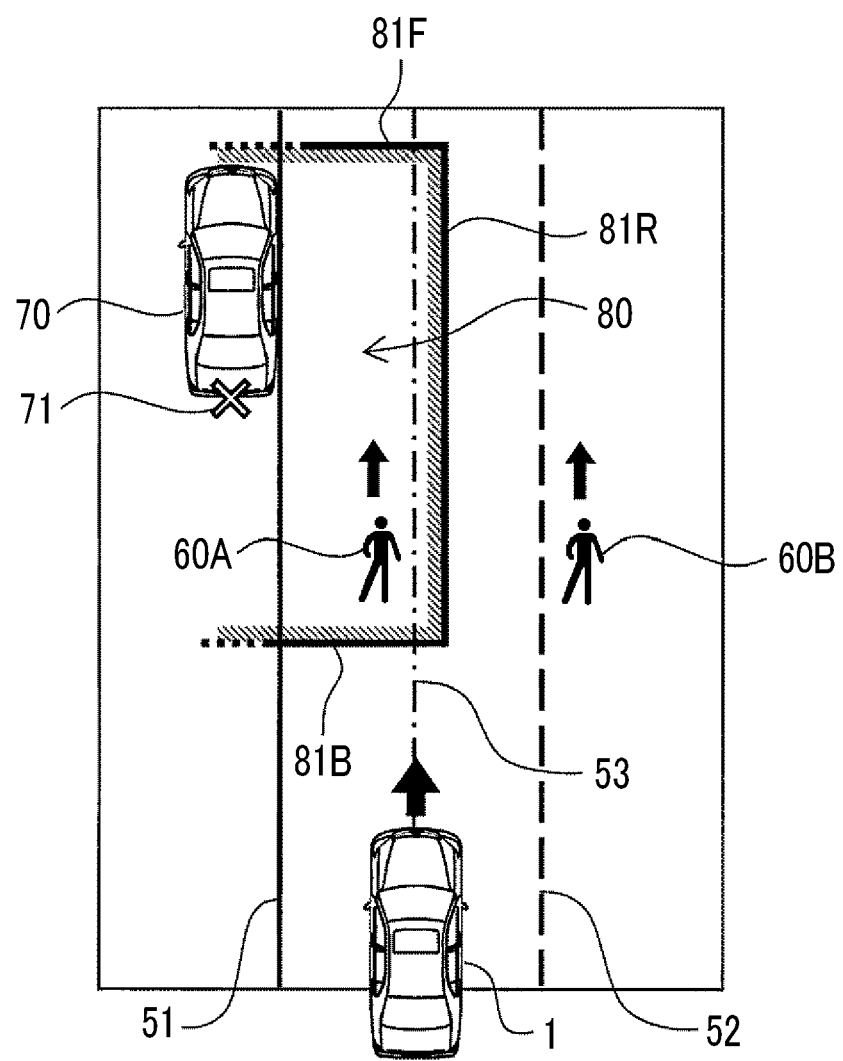
FIG. 3 is a diagram showing setting of the first traveling direction boundary line of the specified area.

From the above, during specified area defining, the pedestrian 60 in Scene 1A illustrated in FIG. 2A, Scene 1B illustrated in FIG. 2B, and Scene 1C illustrated in FIG. 2C may be moved into the specified area whereas the pedestrian 60 in Scene 1D illustrated in FIG. 2D may be moved to the outside of the specified area. Illustrated in FIG. 3 is a method for creating a specified area satisfying the request described above.

A specified area 80 is set around a base point 71 on the stopped vehicle 70 as a stationary object. The base point 71 can be set by any method. In FIG. 3, the base point 71 is in the middle of the rear end portion of the stopped vehicle 70 recognized from a camera image. The specified area 80 has a rectangular shape formed by two traveling direction boundary lines parallel to the vertical axis of the reference coordinate system and two width direction boundary lines parallel to the horizontal axis of the reference coordinate system. In FIG. 3, a front boundary line 81F and a rear boundary line 81B as the width direction boundary lines and a right side boundary line 81R as a first traveling direction boundary line are illustrated and a left side boundary line as a second traveling direction boundary line is not illustrated. Setting of the left side boundary line as the second traveling direction boundary line will be described later. The front boundary line 81F and the rear boundary line 81B may be set at positions at least sandwiching the stopped vehicle 70 from the front and behind.

The right side boundary line 81R is set on the side opposite to the stopped vehicle 70 across the host vehicle course prediction line 53 as a reference line. In other words, the right side boundary line 81R is set such that an object on the host vehicle course prediction line 53 is enclosed in the specified area 80. As a result of this setting of the right side boundary line 81R, intensive driving support for collision avoidance is allowed to function with respect to a pedestrian 60A moving on the stopped vehicle 70 side with respect to the host vehicle course prediction line 53 as a reference line, that is, a pedestrian 60A with which the host vehicle 1 may collide.

With respect to a pedestrian 60B outside the specified area 80 and on the side opposite to the stopped vehicle 70 with respect to the host vehicle course prediction line 53, the driver's discomfort can be suppressed as much as possible by means of non-functioning of driving support with a fast support timing and a large support amount. In addition, the possibility of a collision between the host vehicle 1 and the pedestrian 60B can be further reduced with the driver's discomfort suppressed as much as possible by means of driving support with a relatively slow support timing and a relatively small support amount.

Figure 4A:
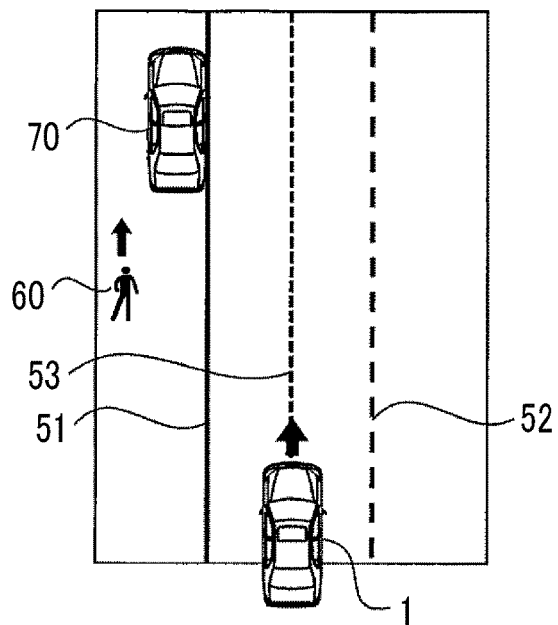
FIG. 4A is a diagram illustrating an example of the positional relationship among the host vehicle, the stationary object, and the moving body considered during setting of a second traveling direction boundary line of the specified area.
Figure 4B:
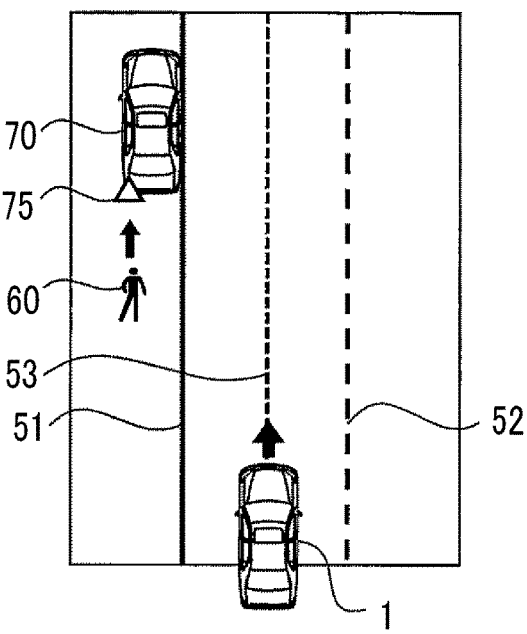
FIG. 4B is a diagram illustrating an example of the positional relationship among the host vehicle, the stationary object, and the moving body considered during setting of the second traveling direction boundary line of the specified area.
Figure 4C:
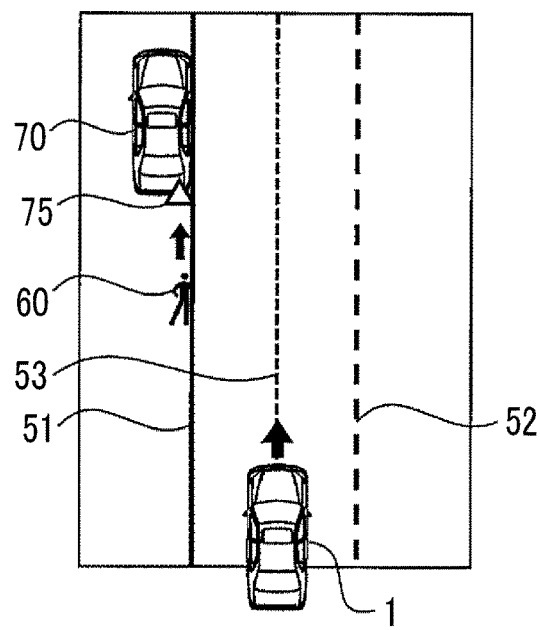
FIG. 4C is a diagram illustrating an example of the positional relationship among the host vehicle, the stationary object, and the moving body considered during setting of the second traveling direction boundary line of the specified area.

Setting of the second traveling direction boundary line of the specified area 80 will be described below. FIGS. 4A to 4C are diagrams illustrating examples of the positional relationship among the host vehicle, the stationary object, and the moving body considered during setting of the second traveling direction boundary line of the specified area 80. Illustrated in FIGS. 4A to 4C are three scenes that differ from one another in terms of the positional relationship among the host vehicle 1, the stopped vehicle 70 as a stationary object, and the pedestrian 60 as a moving body. The scenes illustrated in FIGS. 4A to 4C differ from one another merely in terms of the position of the pedestrian 60 in the direction of the horizontal axis of the reference coordinate system (road width direction) as is the case with the scenes illustrated in FIGS. 2A to 2D.

In each of Scene 2A illustrated in FIG. 4A, Scene 2B illustrated in FIG. 4B, and Scene 2C illustrated in FIG. 4C, the pedestrian 60 moves toward the stopped vehicle 70 outside the roadway outside line 51. In Scene 2A illustrated in FIG. 4A, however, the stopped vehicle 70 is not positioned on the course of the pedestrian 60. The stopped vehicle 70 is positioned on the course of the pedestrian 60 in Scene 2B illustrated in FIG. 4B and Scene 2C illustrated in FIG. 4C. A collision prediction point 75, where the stopped vehicle 70 and the pedestrian 60 are predicted to collide with each other, is to the left of the middle of the stopped vehicle 70, that is, on a side far from the roadway outside line 51 in Scene 2B illustrated in FIG. 4B. In Scene 2C illustrated in FIG. 4C, the collision prediction point 75 is to the right of the middle of the stopped vehicle 70, that is, on a side close to the roadway outside line 51.

Considering each scene, in Scene 2A illustrated in FIG. 4A, the course of the pedestrian 60 is not blocked by the stopped vehicle 70, and thus the pedestrian 60 does not have to avoid the stopped vehicle 70. Therefore, it can be said that the pedestrian 60 is highly unlikely to move to the inside of the roadway outside line 51 in Scene 2A illustrated in FIG. 4A. Desirable as a result is, for example, specified area defining leading to non-operation of intensive driving support for collision avoidance. Even when the pedestrian 60 moves to the inside of the roadway outside line 51 in this case, the driver can be aware of a collision risk because of operation of mild driving support for collision avoidance. Furthermore, the conventional PCS is operated with a condition satisfied, and thus a collision between the host vehicle 1 and the pedestrian 60 is further suppressed or collision damage is further mitigated.

In Scene 2B illustrated in FIG. 4B and Scene 2C illustrated in FIG. 4C, the pedestrian 60 may move to the inside of the roadway outside line 51 in order to avoid the stopped vehicle 70. Especially in Scene 2C illustrated in FIG. 4C, the possibility of the pedestrian 60 selecting a route to bypass the stopped vehicle 70 from the right side despite the empty left side of the stopped vehicle 70 is relatively high. In Scene 2B illustrated in FIG. 4B, the possibility of the pedestrian 60 selecting a route to bypass the stopped vehicle 70 from the left side is relatively high when the left side of the stopped vehicle 70 is empty. Accordingly, intensive driving support for collision avoidance can be deemed unnecessary in Scene 2B illustrated in FIG. 4B. Even in Scene 2B illustrated in FIG. 4B, however, it cannot be said that the pedestrian 60 will not select the route to bypass the stopped vehicle 70 from the right side. Therefore, desirable in both Scene 2B illustrated in FIG. 4B and Scene 2C illustrated in FIG. 4C based on the basic idea of "risk avoidance" is, for example, specified area defining for operation of intensive driving support for collision avoidance.

Figure 5:
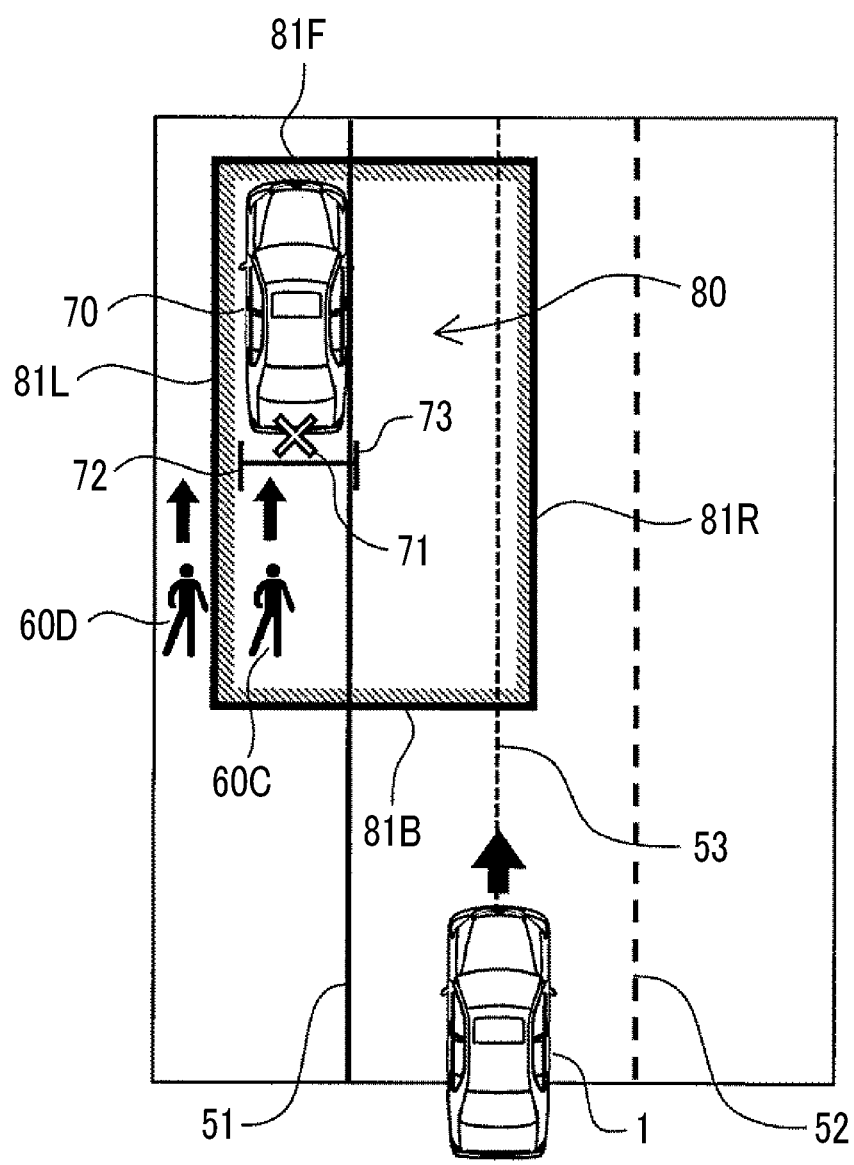
FIG. 5 is a diagram showing setting of the second traveling direction boundary line of the specified area.

From the above, during specified area defining, the pedestrian 60 in Scene 2B illustrated in FIG. 4B and Scene 2C illustrated in FIG. 4C may be moved into the specified area whereas the pedestrian 60 in Scene 2A illustrated in FIG. 4A may be moved to the outside of the specified area. Illustrated in FIG. 5 is a method for creating a specified area satisfying the request described above.

As described above, the specified area 80 is a rectangular region set around the base point 71 on the stationary object and formed by a traveling direction boundary line 81L, the traveling direction boundary line 81R, and the two width direction boundary lines 81F, 81B. The right side boundary line 81R as the first traveling direction boundary line is set as described above. In addition, the front boundary line 81F and the rear boundary line 81B are set as described above. Setting of the left side boundary line 81L as the second traveling direction boundary line will be described below.

The camera sensor 5 recognizes the stopped vehicle 70 with both width-direction ends 72, 73 and the left side boundary line 81L is set on the side opposite to the host vehicle course prediction line 53 across the end portion (left end) 72, which is on a side far from the host vehicle course prediction line 53 as a reference line. In other words, the left side boundary line 81L is set such that an object in the vehicle width of the stopped vehicle 70 is enclosed in the specified area 80. As a result of this setting of the left side boundary line 81L, intensive driving support for collision avoidance is allowed to function with respect to a pedestrian 60C moving inside the left end 72 of the stopped vehicle 70, that is, a pedestrian 60C likely to enter the course of the host vehicle 1 in order to avoid the stopped vehicle 70.

With respect to a pedestrian 60D outside the specified area 80 and outside the left end 72 of the stopped vehicle 70, that is, a pedestrian 60D highly unlikely to enter the course of the host vehicle 1, the driver's discomfort can be suppressed as much as possible by means of non-functioning of intensive driving support with a relatively fast support timing and a relatively large support amount. In addition, the possibility of a collision between the host vehicle 1 and the pedestrian 60D can be further reduced with the driver's discomfort suppressed as much as possible by means of mild driving support with a relatively slow support timing and a relatively small support amount.

Driving Support Control for Collision Avoidance

Figure 6:
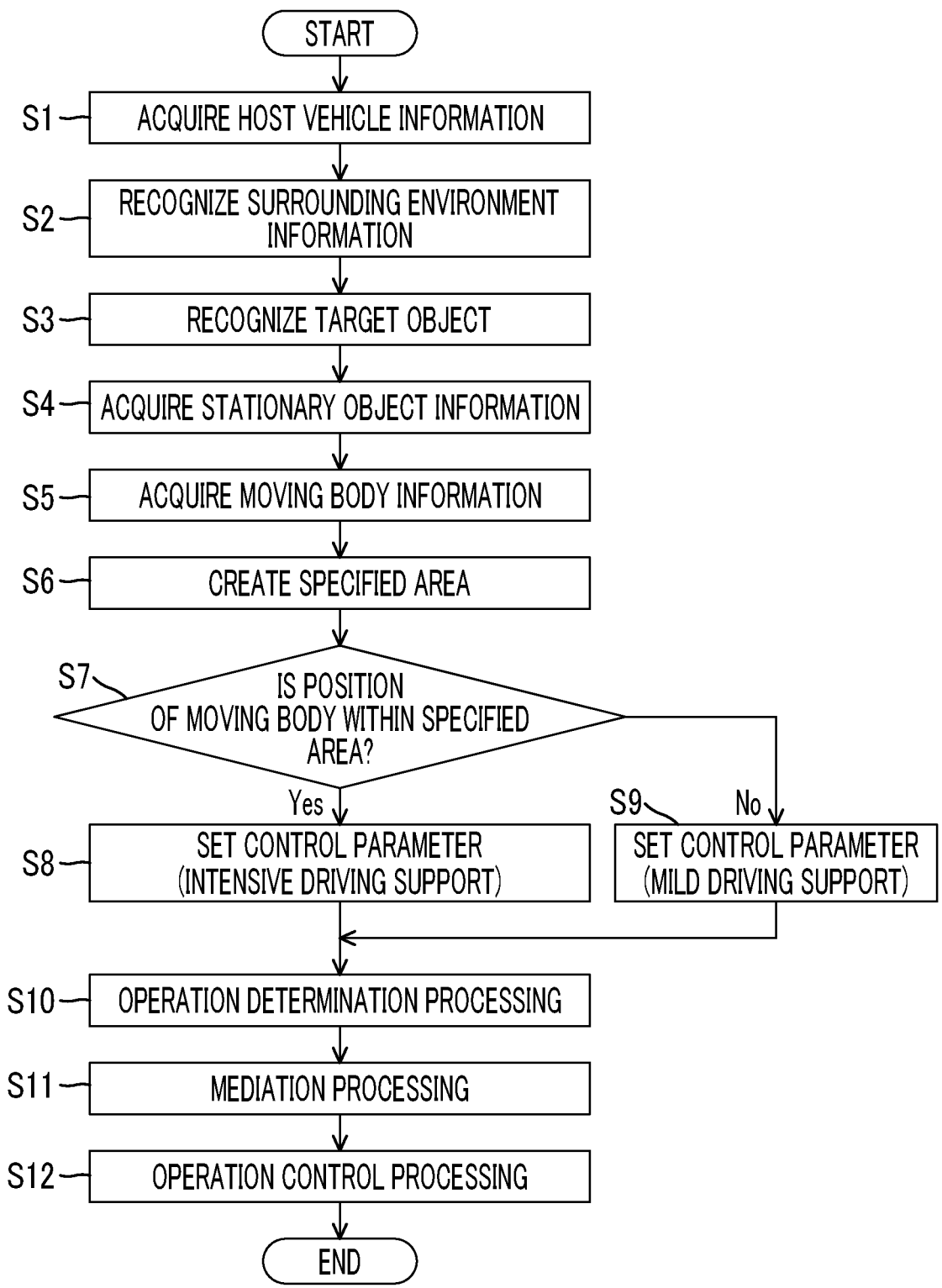
FIG. 6 is a flowchart illustrating the flow of driving support control for collision avoidance according to a first embodiment.

The vehicle control device 10 configured as described above executes driving support control for collision avoidance while the host vehicle 1 is driven by the driver. FIG. 6 is a flowchart illustrating the flow of the driving support control for collision avoidance according to the present embodiment. The vehicle control device 10 repeatedly executes the processing illustrated in the flowchart at a predetermined cycle.

The processing of Step S1 is performed by the host vehicle information acquisition unit 11. In Step S1, the motion states of the host vehicle are calculated based on information from the vehicle speed sensor 2 and information from the yaw rate sensor 3 and the host vehicle course prediction line is calculated from the motion states of the host vehicle.

The processing of Steps S2 to S5 is performed by the object recognition unit 12. In Step S2, surrounding environment information is recognized by means of information acquired from the millimeter wave sensor 4 and information acquired from the camera sensor 5. In Step S3, a target object is recognized from the surrounding environment information recognized in Step S2. In the processing of Step S3, the type of the target object (such as an automobile, a pedestrian, and a two-wheeled vehicle) is recognized by, for example, pattern matching. In Step S4, stationary object information is acquired from the information on the target object recognized in Step S3. The stationary object information includes at least the position and the size of a stationary object. In Step S5, moving body information is acquired from the information on the target object recognized in Step S3. The moving body information includes at least the position and the size of a moving body.

The processing of Step S6 is performed by the specified area defining unit 13. In Step S6, a specified area is defined in accordance with the above-described defining method and based on the host vehicle information acquired in Step S1, the stationary object information acquired in Step S4, and the moving body information acquired in Step S5.

The processing of Step S7 is performed by the area inside-outside determination unit 14. In Step S7, the area inside-outside determination unit 14 determines whether or not the position of the moving body is within the specified area defined in Step S6. Making of the above-described determination is limited to a case where both the stationary object and the moving body are included in the target objects recognized in Step S3. In a case where no stationary object is included in the target objects recognized in Step S3, the processing starting from Step S4 is skipped without exception although this is not illustrated here. In a case where no moving body is included in the target objects recognized in Step S3, the processing starting from Step S5 is skipped without exception although this is not illustrated here.

The processing of Step S8 is selected in a case where the position of the moving body is within the specified area. The processing of Step S9 is selected in a case where the position of the moving body is outside the specified area. The processing of Step S8 and Step S9 is performed by the control parameter setting unit 15. In Step S8, each control parameter value is set such that intensive driving support for collision avoidance is provided. For example, the support timing threshold for support timing determination is set to a relatively small value and the control amount corresponding to a support amount and the avoidance margin width are set to relatively large values. In Step S9, each control parameter value is set such that mild driving support for collision avoidance is provided. For example, the support timing threshold for support timing determination is set to a relatively large value and the control amount corresponding to a support amount and the avoidance margin width are set to relatively small values.

The processing of Step S10 is performed by the operation determination unit 16. In Step S10, the operation determination unit 16 determines whether or not to operate driving support for collision avoidance by using the support timing threshold set in Step S8 or Step S9. For example, in a case where the determination parameter is the TTC, the operation determination unit 16 compares the TTC threshold as the support timing threshold to a calculated TTC value calculated from the relative speed and the distance between the host vehicle and the moving body. In a case where the calculated TTC value is within the TTC threshold, the operation determination unit 16 determines that driving support for collision avoidance should be operated. In this case, the brake force set in Step S8 or Step S9 is given to the automatic braking controller 21 as a deceleration request. In addition, the steering torque and the avoidance margin width set in Step S8 or Step S9 are given to the automatic steering controller 22 as avoidance steering requests. In addition, an alarm request is given to the notification controller 23.

The processing of Step S11 and Step S12 is performed by the automatic braking controller 21, the automatic steering controller 22, and the notification controller 23. In Step S11, mediation of control amount- and alarm-related requests is performed between this control and another control. With regard to the brake force, for example, a request given from adaptive cruise control (hereinafter, referred to as ACC) to the automatic braking controller 21 is also included. With regard to the steering torque, a request given from lane trace control (hereinafter, referred to as LTC) to the automatic steering controller 22 is also included. Furthermore, the PCS also gives a request to each of the automatic braking controller 21 and the automatic steering controller 22. The mediation processing is processing for determining a request to be realized in accordance with an order of priority determined in advance in a case where requests are simultaneously given from the different types of control described above. The same applies to the alarm request given to the notification controller 23, and an alarm that should be given the highest priority is determined by the mediation processing in the event of a plurality of overlapping alarm requests. In an example of the order of priority, the request from the PCS has the highest priority, followed by the request from this control higher in priority than the request from the ACC and the request from the LTC. In Step S12, the braking actuator 6, the steering actuator 7, and the HMI 8 are operated in accordance with the request determined by the mediation processing.

Second Embodiment

Characteristics of Second Embodiment

The second embodiment is characterized by the control parameter setting being changed inside and outside the specified area and the control parameter setting being additionally changed depending on the positional relationship between the host vehicle course prediction line and the moving body also inside the specified area. The above will be described below with reference to FIGS. 7A and 7B.

Figure 7A:
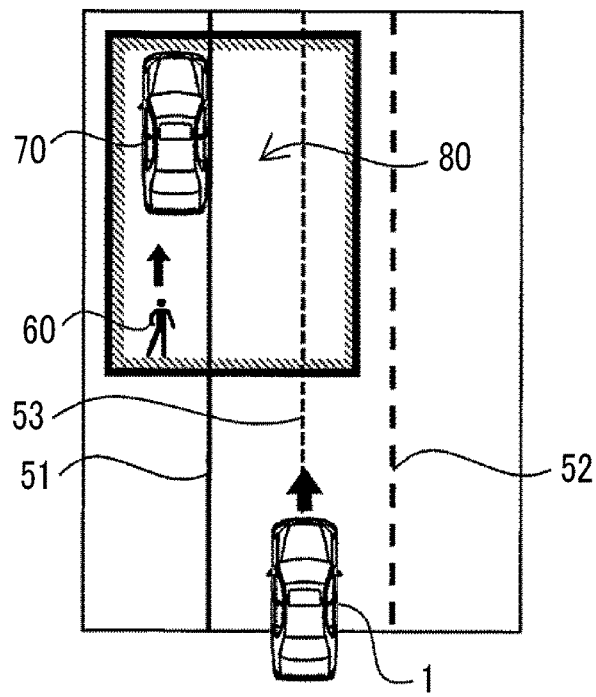
FIG. 7A is a diagram illustrating an example of the positional relationship between a host vehicle course prediction line and a moving body considered during control parameter setting.
Figure 7B:
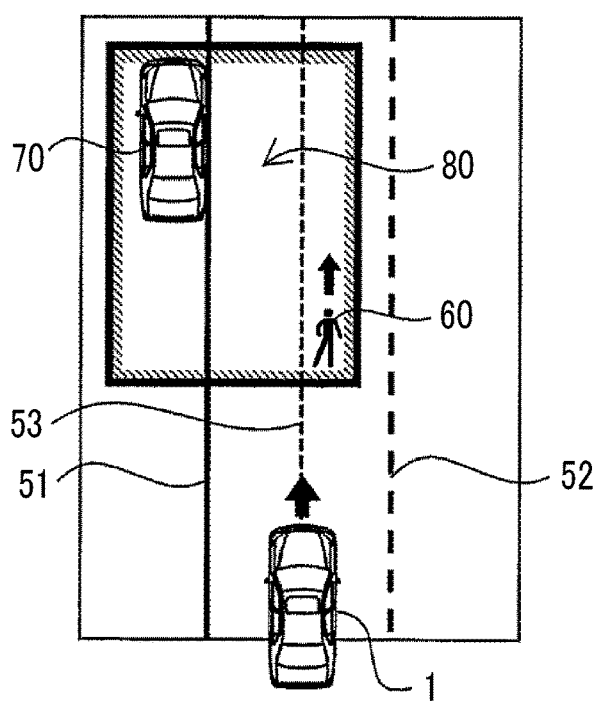
FIG. 7B is a diagram illustrating an example of the positional relationship between the host vehicle course prediction line and the moving body considered during control parameter setting.

FIGS. 7A and 7B are diagrams illustrating examples of the positional relationship between the host vehicle course prediction line and the moving body considered during control parameter setting. Illustrated in FIGS. 7A and 7B are two scenes that differ from each other in terms of the positional relationship between the host vehicle course prediction line 53 as a reference line and the pedestrian 60 as a moving body. The scenes illustrated in FIGS. 7A and 7B differ from each other merely in terms of the position of the pedestrian 60 in the direction of the horizontal axis of the reference coordinate system (road width direction). In addition, in FIGS. 7A and 7B, a wide specified area 80 is on the side opposite to the stopped vehicle 70 with respect to the host vehicle course prediction line 53. This is to further reduce the possibility of a collision between the moving body and the host vehicle 1.

In Scene 3A illustrated in FIG. 7A, the pedestrian 60 moves toward the stopped vehicle 70 outside the roadway outside line 51. In Scene 3B illustrated in FIG. 7B, the pedestrian 60 is positioned inside the roadway outside line 51 and on the side opposite to the stopped vehicle 70 across the host vehicle course prediction line 53.

Considering each scene, in Scene 3A illustrated in FIG. 7A, the pedestrian 60 may move to the inside of the roadway outside line 51 in order to avoid the stopped vehicle 70. In Scene 3B illustrated in FIG. 7B, the pedestrian 60 is in the vehicle width of the host vehicle 1. Therefore, desirable for both Scene 3A illustrated in FIG. 7A and Scene 3B illustrated in FIG. 7B is, for example, operation of intensive driving support for collision avoidance. Accordingly, the specified area 80 is actually defined so. In Scene 3B illustrated in FIG. 7B, however, the pedestrian 60 does not enter the course of the host vehicle 1 to avoid the stopped vehicle 70. Avoidance steering and deceleration with respect to a moving body irrelevant to the stopped vehicle 70, such as the pedestrian 60 in Scene 3B illustrated in FIG. 7B, result in the driver's discomfort as divergence from the driver's sense.

In the present embodiment, the driving support that is operated with respect to the pedestrian 60 in Scene 3B illustrated in FIG. 7B is slower in support timing and smaller in support amount than the driving support that is operated with respect to the pedestrian 60 in Scene 3A illustrated in FIG. 7A. Specifically, the driving support for collision avoidance is slower in support timing and smaller in support amount in a case where the pedestrian 60 is positioned on the side opposite to the stopped vehicle 70 across the host vehicle course prediction line 53 in the specified area 80 than in a case where the pedestrian 60 and the stopped vehicle 70 are positioned on the same side. Still, the driving support that is operated with respect to the pedestrian 60 in Scene 3B illustrated in FIG. 7B has the same or a faster support timing and the same or a larger support amount in comparison to a case where the pedestrian 60 is positioned outside the specified area 80. In other words, driving support milder than driving support with respect to a moving body positioned outside the specified area 80 is not performed insofar as the target moving object is positioned inside the specified area 80.

Driving Support Control for Collision Avoidance

Figure 8:
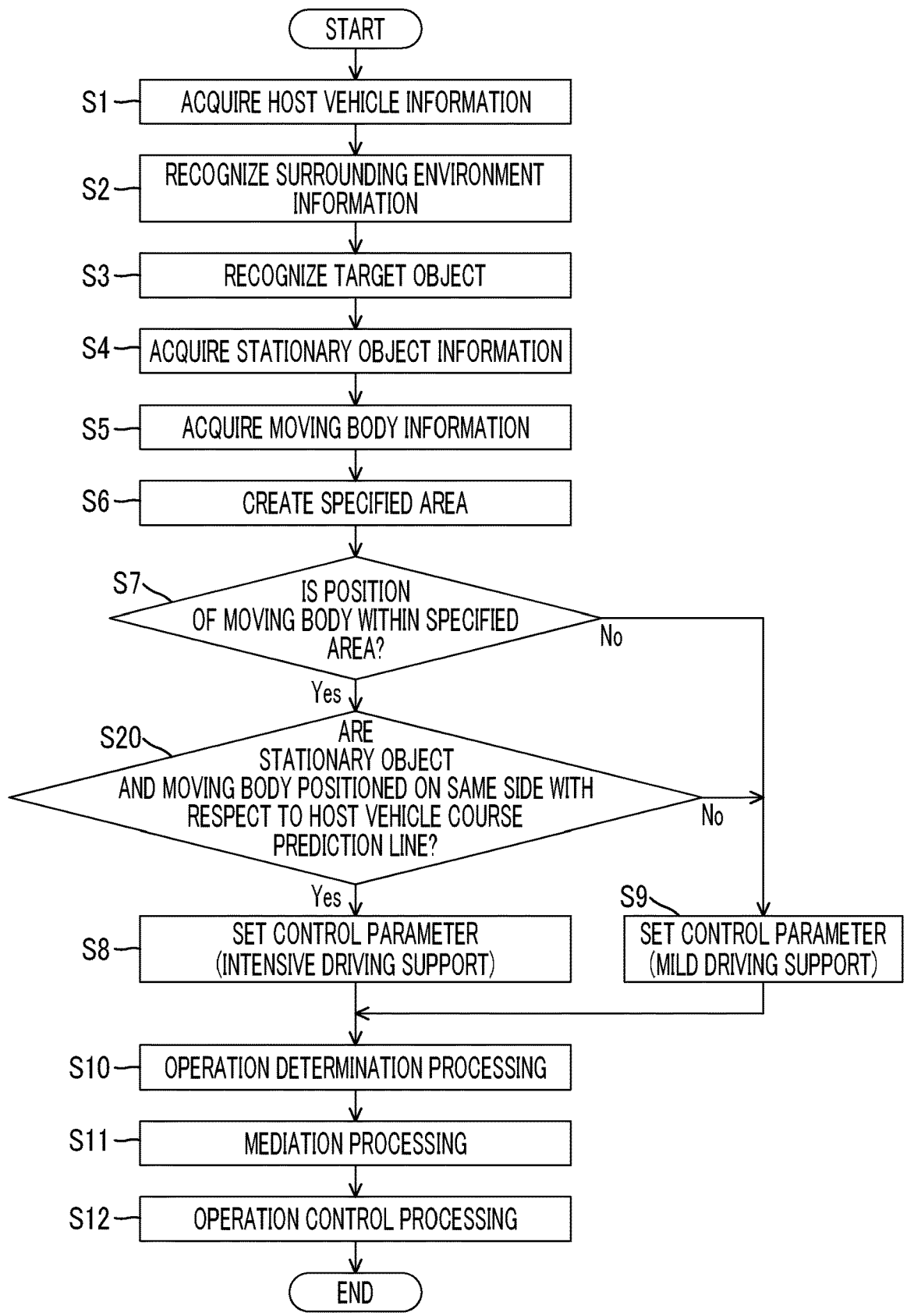
FIG. 8 is a flowchart illustrating the flow of driving support control for collision avoidance according to a second embodiment.

FIG. 8 is a flowchart illustrating the flow of the driving support control for collision avoidance according to the present embodiment. The vehicle control device 10 repeatedly executes the processing illustrated in the flowchart at a predetermined cycle. In the flowchart, the same step numbers are attached to the processing of the same content as in the driving support control according to the first embodiment so that the description of the processing of the same content as in the driving support control according to the first embodiment is not repeated.

In the present embodiment, the processing of Step S20 is selected in a case where a determination is made in Step S7 that the position of the moving body is within the specified area. The processing of Step S20 is performed by the control parameter setting unit 15. In Step S20, the control parameter setting unit 15 determines whether or not the stationary object and the moving body are positioned on the same side with respect to the host vehicle course prediction line.

The processing of Step S8 is selected in a case where the stationary object and the moving body are positioned on the same side with respect to the host vehicle course prediction line. The processing of Step S9 is selected in a case where the stationary object and the moving body are positioned on different sides with respect to the host vehicle course prediction line. In other words, each control parameter value is set such that mild driving support for collision avoidance is provided as in a case where the moving body is positioned outside the specified area. The above is merely an example, and each control parameter value may also be set such that more intensive driving support is provided than in a case where the moving body is positioned outside the specified area.

Third Embodiment

Characteristics of Third Embodiment

The third embodiment is characterized by the control parameter setting being changed inside and outside the specified area and the control parameter setting being additionally changed depending on the positional relationship between the specified area and the roadway outside line. The above will be described below with reference to FIGS. 9A to 9C.

Figure 9A:
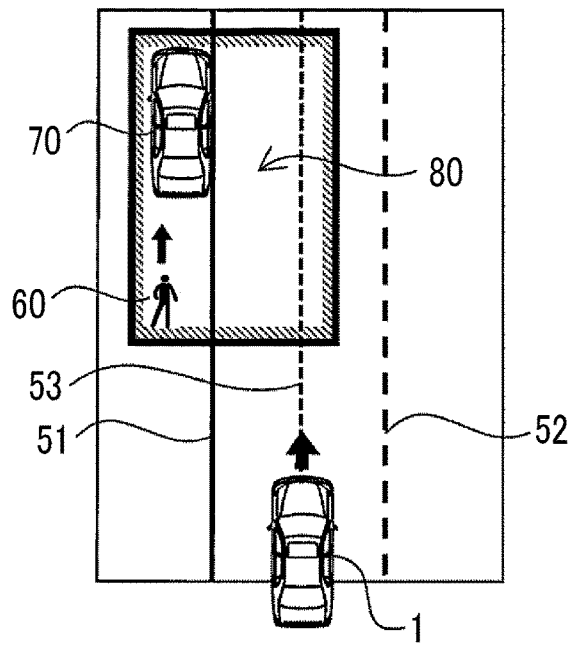
FIG. 9A is a diagram illustrating an example of the positional relationship between a roadway outside line and the specified area considered during control parameter setting.
Figure 9B:
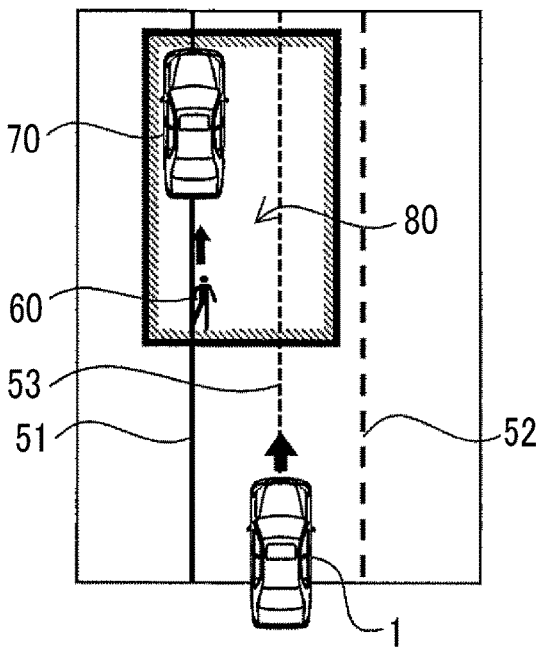
FIG. 9B is a diagram illustrating an example of the positional relationship between the roadway outside line and the specified area considered during control parameter setting.
Figure 9C:
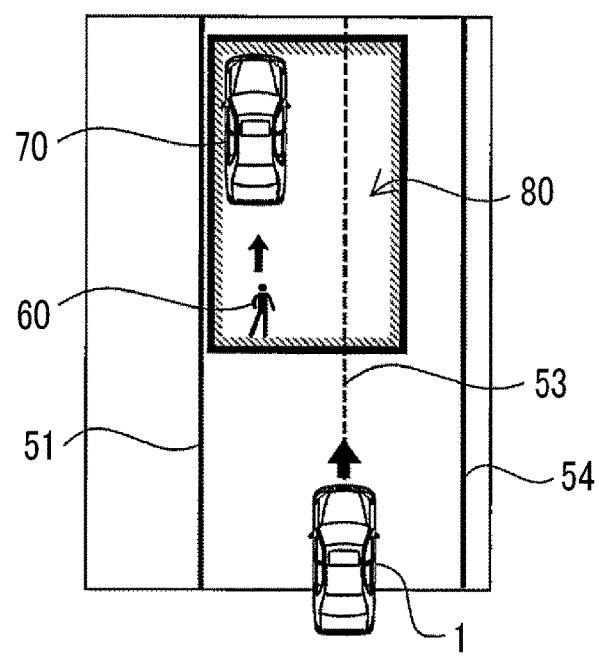
FIG. 9C is a diagram illustrating an example of the positional relationship between the roadway outside line and the specified area considered during control parameter setting.

FIGS. 9A to 9C are diagrams illustrating examples of the positional relationship between the specified area and the roadway outside line considered during control parameter setting. Illustrated in FIGS. 9A to 9C are three scenes that differ from one another in terms of the positional relationship between the specified area 80 and the roadway outside line 51. The scenes illustrated in FIGS. 9A to 9C differ from one another merely in terms of the position of the stopped vehicle 70 in the direction of the horizontal axis of the reference coordinate system (road width direction) and the position of the specified area 80 defined based on the stopped vehicle 70 as a reference.

In Scene 4A illustrated in FIG. 9A, the stopped vehicle 70 is positioned outside the roadway outside line 51 and the specified area 80 defined based on the stopped vehicle 70 as a reference straddles the roadway outside line 51. In Scene 4B illustrated in FIG. 9B, the stopped vehicle 70 is positioned on the roadway outside line 51 and the specified area 80 defined based on the stopped vehicle 70 as a reference straddles the roadway outside line 51. In Scene 4C illustrated in FIG. 9C, the stopped vehicle 70 is positioned inside the roadway outside line 51 and the specified area 80 defined based on the stopped vehicle 70 as a reference does not straddle the roadway outside line 51. The case as in Scene 4C illustrated in FIG. 9C is often seen in, for example, a wide one-way road where both sides of the lane are roadway outside lines 51, 54.

Considering each scene, in Scene 4A illustrated in FIG. 9A, the sidewalk is blocked by the stopped vehicle 70, and thus the possibility of the pedestrian 60 moving to the inside of the roadway outside line 51 in order to avoid the stopped vehicle 70 is relatively high. In Scene 4B illustrated in FIG. 9B, there may be a space for passage of the pedestrian 60 outside the stopped vehicle 70. However, the possibility of the pedestrian 60 moving to the inside of the roadway outside line 51 in order to avoid the stopped vehicle 70 is not low. In Scene 4C illustrated in FIG. 9C, there is a sufficient space outside of the roadway outside line 51, and thus the possibility of the pedestrian 60 moving to the inside of the roadway outside line 51 is not higher than in Scene 4A illustrated in FIG. 9A and Scene 4B illustrated in FIG. 9B.

In the present embodiment, the driving support that is operated with respect to the pedestrian 60 in Scene 4A illustrated in FIG. 9A and Scene 4B illustrated in FIG. 9B is faster in support timing and larger in support amount than the driving support that is operated with respect to the pedestrian 60 in Scene 4C illustrated in FIG. 9C. Specifically, the driving support for collision avoidance is faster in support timing and larger in support amount in a case where the specified area 80 straddles the roadway outside line 51, that is, in a case where the possibility of no space outside the roadway outside line 51 is relatively high than in a case where the specified area 80 does not straddle the roadway outside line 51. As a result, the possibility of a collision between the host vehicle 1 and the pedestrian 60 in the specified area 80 can be further reduced.

Driving Support Control for Collision Avoidance

Figure 10:
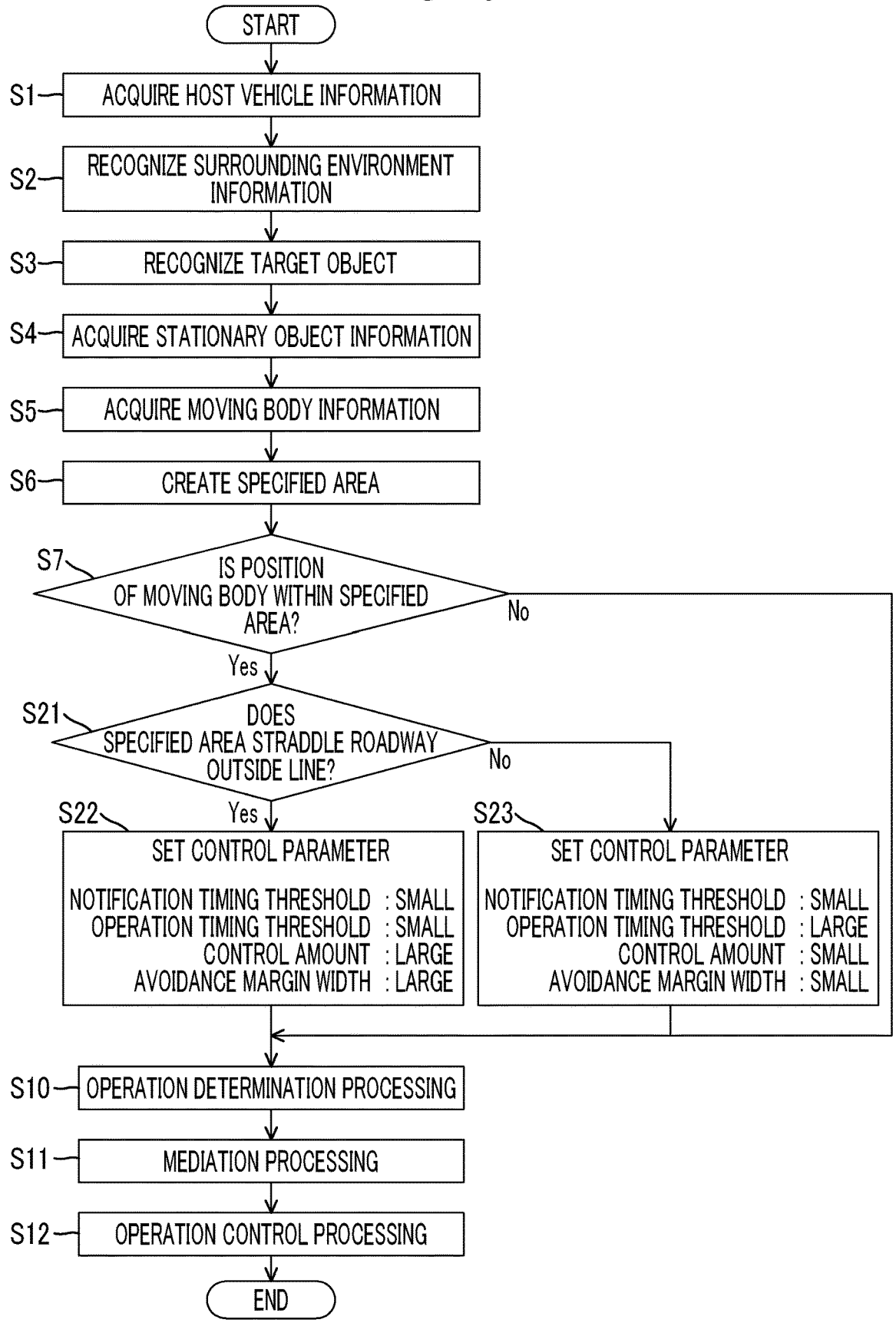
FIG. 10 is a flowchart illustrating the flow of driving support control for collision avoidance according to a third embodiment.

FIG. 10 is a flowchart illustrating the flow of the driving support control for collision avoidance according to the present embodiment. The vehicle control device 10 repeatedly executes the processing illustrated in the flowchart at a predetermined cycle. In the flowchart, the same step numbers are attached to the processing of the same content as in the driving support control according to the first embodiment so that the description of the processing of the same content as in the driving support control according to the first embodiment is not repeated.

In the present embodiment, the processing of Step S21 is selected in a case where a determination is made in Step S7 that the position of the moving body is within the specified area. The processing of Step S21 is performed by the control parameter setting unit 15. In Step S21, the control parameter setting unit 15 determines whether or not the specified area defined in Step S6 straddles the roadway outside line.

The processing of Step S22 is selected in a case where the specified area straddles the roadway outside line. The processing of Step S23 is selected in a case where the specified area does not straddle the roadway outside line. In Step S22 and Step S23, each control parameter value is set such that intensive driving support for collision avoidance is provided. Still, each control parameter value set in Step S22 is set such that more intensive driving support can be provided than in the case of each control parameter value set in Step S23. Specifically, as shown in this flowchart, for example, the operation timing threshold set in Step S22 is set to a relatively small value and the control amount and the avoidance margin width set in Step S22 are set to relatively large values. The value of the notification timing threshold does not depend on whether or not the specified area straddles the roadway outside line. However, the value set in Step S22 may be set to a value relatively smaller than the value set in Step S23.

According to this flowchart, driving support (mild driving support) for collision avoidance is not performed in a case where a determination is made in Step S7 that the position of the moving body is outside the specified area. This is because driving support for collision avoidance outside the specified area is optional during implementation of the disclosure. In this case, the conventional PCS is operated with a condition satisfied, and thus a collision between the host vehicle and the moving body is further suppressed or collision damage is further mitigated by the PCS even in the event of the risk of the collision between the host vehicle and the moving body.

Another Embodiment

The driving support for collision avoidance may include one or both of a prior increase in brake pressure and prior brake pad shrinkage in a case where the braking actuator is a hydraulic brake.

In the embodiments, the camera sensor 5 and the millimeter wave sensor 4 are used in combination. However, information may be obtained from at least the camera sensor 5 during implementation of the disclosure.

In the embodiments of the disclosure, the driving support control for collision avoidance is configured as control separate from the conventional PCS. However, the driving support control for collision avoidance can also be configured as a part of the PCS.

The embodiments of the disclosure have been described on the premise of a road of left-hand traffic. However, it is a matter of course that the vehicle control device according to the aspect of the disclosure is also applicable to vehicles traveling on a road of right-hand traffic.

In the embodiments, the intensive driving support and the mild driving support differ from each other in terms of both the support timing and the support amount. However, the intensive driving support and the mild driving support may differ from each other in terms of either the support timing or the support amount instead.

In the embodiments, the host vehicle course prediction line is a reference line for setting of the right and left boundary lines of the specified area. However, the host vehicle course prediction line and the reference line do not necessarily have to correspond to each other. For example, the reference line may be a line parallel to a host vehicle course prediction line passing through the width-direction end portion of the host vehicle that is on a side far from a stationary object.

What is claimed is:

1. A control device for a vehicle including a camera sensor, the control device comprising
    an electronic control unit configured to:
        recognize objects present in front of a host vehicle by using at least the camera sensor;
        define a specified area by using a position of a stationary object as a reference when the recognized objects include the stationary object; and
        perform first driving support when the electronic control unit determines that the recognized objects include a moving body that is positioned within the specified area,
    wherein the first driving support reduces a possibility of a collision between the moving body and the host vehicle,
    wherein the specified area is defined by boundary lines including a first traveling direction boundary line extending in a traveling direction of the host vehicle, and which is parallel to a reference line that is a predicted course of the host vehicle,
    wherein an inside of the specified area is located at a same side of the first traveling direction boundary line on which the stationary object is positioned, and the reference line is located between the first traveling direction boundary line and the stationary object,
    wherein the electronic control unit is configured to cause at least the support timing of the first driving support to become slower or to cause a support amount of the first driving support to become smaller when the moving body is positioned in the specified area and on an opposite side of the reference line from the stationary object compared to when the moving body is positioned in the specified area and on the same side of the reference line as the stationary object.

2. The control device according to claim 1, wherein:
the electronic control unit is configured to perform second driving support when the electronic control unit determines that the moving body is not positioned within the specified area; and
the second driving support is support that reduces the possibility of the collision between the moving body and the host vehicle, and is at least slower in support timing or smaller in support amount than the first driving support.

3. The control device according to claim 1, wherein:
boundary lines partitioning the specified area include a second traveling direction boundary line extending in the traveling direction of the host vehicle;
the inside of the specified area is from the first traveling direction boundary line to the second traveling direction boundary line; and
the second traveling direction boundary line is set on a side opposite to the reference line across an end portion on a side far from the reference line as one of both width-direction ends of the stationary object.

4. The control device according to claim 1, wherein the electronic control unit is configured to cause at least the support timing of the first driving support to become faster or cause a support amount of the first driving support to become larger when the specified area straddles a roadway outside line recognized by the camera sensor than when the specified area does not straddle the roadway outside line.

5. The control device according to claim 1, wherein the first driving support includes at least one of supporting deceleration of the host vehicle by a driver, supporting steering of the host vehicle by the driver, and issuing an alarm with respect to the driver.

6. A control method for a vehicle including a camera sensor and an electronic control unit, the control method comprising:

recognizing, by the electronic control unit, objects present in front of a host vehicle by using at least the camera sensor;
defining, by the electronic control unit, a specified area by using a position of a stationary object as a reference when the recognized objects include the stationary object; and
performing, by the electronic control unit, first driving support when the electronic control unit determines that the recognized objects include a moving body that is positioned within the specified area,
wherein the first driving support reduces a possibility of a collision between the moving body and the host vehicle,
wherein the specified area is defined by boundary lines including a first traveling direction boundary line extending in a traveling direction of the host vehicle, and which is parallel to a reference line that is a predicted course of the host vehicle,
wherein an inside of the specified area is located at a same side of the first traveling direction boundary line on which the stationary object is positioned, and the reference line is located between the first traveling direction boundary line and the stationary object,
causing, by the electronic control unit, at least the support timing of the first driving support to become slower or to cause a support amount of the first driving support to become smaller when the moving body is positioned in the specified area and on an opposite side of the reference line from the stationary object compared to when the moving body is positioned in the specified area and on the same side of the reference line as the stationary object.

* * * * *